United States Patent
Danilov et al.

(10) Patent No.: US 10,402,316 B2
(45) Date of Patent: Sep. 3, 2019

(54) TRACING GARBAGE COLLECTOR FOR SEARCH TREES UNDER MULTI-VERSION CONCURRENCY CONTROL

(71) Applicant: EMC Corporation, Hopkinton, MA (US)

(72) Inventors: Mikhail Danilov, Saint Petersburg (RU); Mikhail Malygin, Saint Petersburg (RU); Chen Wang, Shanghai (CN); Ivan Tchoub, Saint Petersburg (RU); Shashwat Srivastav, Seattle, WA (US); Andrey Fomin, Vesevolozhsk (RU); Maxim Trusov, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 527 days.

(21) Appl. No.: 15/083,324

(22) Filed: Mar. 29, 2016

(65) Prior Publication Data
US 2017/0083549 A1    Mar. 23, 2017

(30) Foreign Application Priority Data
Sep. 14, 2015    (RU) .............................. 2015139057

(51) Int. Cl.
*G06F 12/02*    (2006.01)
*G06F 16/23*    (2019.01)

(52) U.S. Cl.
CPC ...... *G06F 12/0253* (2013.01); *G06F 12/0246* (2013.01); *G06F 16/2329* (2019.01)

(58) Field of Classification Search
CPC ......... G06F 17/30194; G06F 17/30138; G06F 17/30327; G06F 17/30218; G06F 12/0246; G06F 12/0253
USPC ........................................ 707/813, 821, 831
See application file for complete search history.

(56) References Cited

U.S. PATENT DOCUMENTS

| | | | |
|---|---|---|---|
| 5,519,855 A | 5/1996 | Neeman et al. | |
| 5,758,347 A | 5/1998 | Lo et al. | |
| 5,987,468 A | 11/1999 | Singh et al. | |
| 6,070,003 A | 5/2000 | Gove et al. | |
| 6,550,035 B1 | 4/2003 | Okita | |
| 7,069,469 B2 * | 6/2006 | Pillutla | G06F 11/0748 706/50 |
| 7,549,110 B2 | 6/2009 | Stek et al. | |
| 7,559,007 B1 | 7/2009 | Wilkie | |
| 7,581,156 B2 | 8/2009 | Manasse | |
| 7,707,232 B2 | 4/2010 | Dussud et al. | |
| 8,458,515 B1 | 6/2013 | Saeed | |

(Continued)

OTHER PUBLICATIONS

U.S. Appl. No. 14/929,788, filed Nov. 2, 2015, Kurilov et al.

(Continued)

*Primary Examiner* — Thu Nguyet T Le
(74) *Attorney, Agent, or Firm* — Daly, Crowley Mofford & Durkee, LLP (57) ABSTRACT

Structures and processes for garbage collection of search trees under Multi-Version Concurrency Control (MVCC). Such search trees may be used to store data within a distributed storage system. A process detects live search tree elements using tracing and then identify storage chunks having no live elements as garbage to be reclaimed. The process can be paused and resumed to reduce impact on other system processing.

18 Claims, 9 Drawing Sheets

(56) References Cited

U.S. PATENT DOCUMENTS

| | | |
|---|---|---|
| 8,532,212 B2 | 9/2013 | Ito |
| 8,683,296 B2 | 3/2014 | Anderson et al. |
| 8,683,300 B2 | 3/2014 | Stek et al. |
| 8,762,642 B2 | 6/2014 | Bates et al. |
| 8,843,459 B1 | 9/2014 | Aston et al. |
| 8,886,781 B2 | 11/2014 | Jain et al. |
| 8,914,706 B2 | 12/2014 | Anderson |
| 9,268,806 B1 | 2/2016 | Kesselman |
| 2002/0073103 A1* | 6/2002 | Bottomley .......... G06F 12/0253 |
| 2002/0099765 A1* | 7/2002 | Otis ..................... G06F 12/0276 709/203 |
| 2005/0038968 A1 | 2/2005 | Iwamura et al. |
| 2005/0071335 A1* | 3/2005 | Kadatch ............ G06F 17/30949 |
| 2006/0074990 A1* | 4/2006 | Burka ................. G06F 12/0269 |
| 2006/0105724 A1 | 5/2006 | Nakao |
| 2006/0147219 A1 | 7/2006 | Yoshino et al. |
| 2006/0212495 A1 | 9/2006 | Tokunaga et al. |
| 2008/0126357 A1 | 5/2008 | Casanova et al. |
| 2008/0263114 A1* | 10/2008 | Nath ................. G06F 17/30327 |
| 2009/0112953 A1 | 4/2009 | Barsness et al. |
| 2010/0076940 A1 | 3/2010 | Bordawekar et al. |
| 2010/0091842 A1 | 4/2010 | Ikeda et al. |
| 2010/0180176 A1 | 7/2010 | Yosoku et al. |
| 2010/0198849 A1* | 8/2010 | Thomas ............ G06F 17/30067 707/758 |
| 2010/0246663 A1 | 9/2010 | Citta et al. |
| 2010/0325351 A1* | 12/2010 | Bennett ............... G06F 12/0246 711/103 |
| 2011/0053639 A1 | 3/2011 | Etienne Suanez et al. |
| 2011/0055494 A1 | 3/2011 | Roberts et al. |
| 2011/0196900 A1 | 8/2011 | Drobychev et al. |
| 2011/0246543 A1* | 10/2011 | Gracie ................ G06F 12/0269 707/816 |
| 2012/0051208 A1 | 3/2012 | Li et al. |
| 2012/0095970 A1 | 4/2012 | Shyam et al. |
| 2012/0106595 A1 | 5/2012 | Bhattad et al. |
| 2012/0246204 A1* | 9/2012 | Nalla .................. G06F 12/0253 707/815 |
| 2013/0067187 A1 | 3/2013 | Moss et al. |
| 2013/0185337 A1 | 7/2013 | Lipcon |
| 2013/0282676 A1 | 10/2013 | Wade et al. |
| 2014/0046997 A1 | 2/2014 | Dain et al. |
| 2014/0344216 A1 | 11/2014 | Abercrombie et al. |
| 2016/0098346 A1 | 4/2016 | Pechanec et al. |
| 2016/0239384 A1 | 8/2016 | Slik et al. |
| 2016/0378508 A1 | 12/2016 | Chapman et al. |
| 2017/0004044 A1 | 1/2017 | Tormasov et al. |
| 2017/0046127 A1 | 2/2017 | Fletcher et al. |
| 2017/0060898 A1* | 3/2017 | Lu ..................... G06F 17/30327 |

OTHER PUBLICATIONS

U.S. Appl. No. 15/193,144, filed Jun. 27, 2016, Kurilov et al.
U.S. Appl. No. 15/193,141, filed Jun. 27, 2016, Danilov et al.
U.S. Appl. No. 15/186,576, filed Jun. 20, 2016, Malygin et al.
U.S. Appl. No. 15/193,145, filed Jun. 27, 2016, Fomin et al.
U.S. Appl. No. 15/193,407, filed Jun. 27, 2016, Danilov et al.
U.S. Appl. No. 15/193,142, filed Jun. 27, 2016, Danilov et al.
U.S. Appl. No. 15/193,409, filed Jun. 27, 2016, Trusov et al.
U.S. Appl. No. 15/281,172, filed Sep. 30, 2016, Trusov et al.
Anvin, "The Mathematics of RAID-6;" First Version Jan. 20, 2004; Last Updated Dec. 20, 2011; Retrieved from https://www.kernel.org/pub/linux/kernel/people/hpa/raid6.pdf; 9 Pages.
Blömer et al., "An XOR-Based Erasure-Resilient Coding Scheme;" Article from CiteSeer; Oct. 1999; 19 Pages.
Office Action dated Nov. 27, 2017 from U.S. Appl. No. 15/186,576; 11 Pages.
Office Action dated Dec. 14, 2017 from U.S. Appl. No. 15/281,172; 9 Pages.
Response to Office Action dated Sep. 15, 2017 from U.S. Appl. No. 15/193,409, filed Dec. 14, 2017; 11 Pages.
Response to Office Action dated Oct. 5, 2017 from U.S. Appl. No. 15/193,407, filed Dec. 20, 2017; 12 Pages.
Response to Office Action dated Oct. 18, 2017 from U.S. Appl. No. 15/193,145, filed Jan. 17, 2018; 12 Pages.
U.S. Non-Final Office Action dated Oct. 5, 2017 for U.S. Appl. No. 15/193,407; 14 pages.
U.S. Non-Final Office Action dated Oct. 18, 2017 for U.S. Appl. No. 15/193,145; 21 pages.
U.S. Non-Final Office Action dated Sep. 15, 2017 for U.S. Appl. No. 15/193,409; 12 pages.
Notice of Allowance dated Jul. 23, 2018 for U.S. Appl. No. 15/193,141; 7 pages.
Response to U.S. Non-Final Office Action dated May 16, 2018 for U.S. Appl. No. 15/193,141; Response filed Jun. 19, 2018; 10 pages.
U.S. Non-Final Office Action dated May 16, 2018 for U.S. Appl. No. 15/193,141; 15 pages.
U.S. Non-Final Office Action dated May 16, 2018 for U.S. Appl. No. 15/193,141; 16 Pages.
U.S. Notice of Allowance dated May 21, 2018 for U.S. Appl. No. 15/193,142; 9 Pages.
U.S. Appl. No. 15/620,892, filed Jun. 13, 2017, Danilov et al.
U.S. Appl. No. 15/620,897, filed Jun. 13, 2017, Danilov et al.
U.S. Appl. No. 15/620,898, filed Jun. 13, 2017, Danilov et al.
U.S. Appl. No. 15/620,900, filed Jun. 13, 2017, Danilov et al.
Response to U.S. Non-Final Office Action dated Nov. 27, 2017 for U.S. Appl. No. 15/186,576; filed Feb. 23, 2018; 7 pages.
U.S. Final Office Action dated Mar. 1, 2018 for U.S. Appl. No. 15/193,145; 32 pages.
U.S. Final Office Action dated Mar. 2, 2018 for U.S. Appl. No. 15/193,409; 10 pages.
U.S. Non-Final Office Action dated Feb. 2, 2018 for U.S. Appl. No. 15/398,826; 16 Pages.
Notice of Allowance dated Jul. 23, 2018 for U.S. Appl. No. 15/193,141; 8 Pages.
Non-Final Office Action dated Apr. 11, 2019 for U.S. Appl. No. 15/620,898, 31 Pages.

* cited by examiner

TRACING GARBAGE COLLECTOR FOR SEARCH TREES UNDER MULTI-VERSION CONCURRENCY CONTROL

CROSS REFERENCE TO RELATED APPLICATIONS

This application claims priority to Russian Patent Application Number 2015139057, filed Sep. 14, 2015, and entitled "TRACING GARBAGE COLLECTOR FOR SEARCH TREES UNDER MULTI-VERSION CONCURRENCY CONTROL," which is incorporated herein by reference in its entirety.

BACKGROUND

As is known in the art, multi-version concurrency control (MVCC) is a technique used by databases and storage systems to provide concurrent access to data. With MVCC, each user (e.g., system processes and processes that handle user traffic) sees a snapshot of the data at a particular instant in time. Any changes made by a user will not be seen by other users until the changes are committed. Among other advantages, MVCC provides non-blocking access to a shared resource (e.g., data).

Many storage systems use search trees (e.g., B+ trees) to provide efficient access to stored data. Distributed storage systems (or "clusters") may manage thousands of search trees, each having a very large number (e.g., millions or even billions) of elements. Large search trees are typically stored to disk or other type of non-volatile memory.

To provide MVCC with search trees, a storage system may treat elements of a search tree as immutable. Under MVCC, a search tree may be updated by storing the new/updated data to unused portions of disk, and scheduling a tree update. During a tree update, at least one tree element is updated. In the case of a B+ tree, which includes a root node, internal nodes, and leaves, a tree update requires generating a new leaf to store the data, a new root node, and possibly new internal nodes. These new tree elements may be linked with existing tree elements to form a new search tree. Tree updates result in unused tree elements left on disk and, thus, storage systems typically include a process for detecting and reclaiming unused tree elements (referred to as "garbage collection").

One technique for garbage collecting search trees under MVCC is reference counting. Here, a counter is maintained for each chunk of storage that indicates the number of referenced (or "live") tree elements within the storage chunk. However, implementing reference counting in a distributed storage system is challenging and presents a risk of reclaiming storage capacity that is still in use.

Some existing distributed storage systems use a so-called "stop the world" approach to garbage collection whereby all users block until garbage collection completes. An alternative approach is incremental garbage collection, which does not require stopping other processes.

SUMMARY

It is appreciated herein that a "stop the word" approach to garbage collection is unacceptable for interactive applications where users demand fast data access. Moreover, existing incremental garbage collectors are typically overly conservative, resulting in a failure to reclaim unused storage. Incremental garbage collectors may also require complex synchronization between a garbage collection process and user processes. Thus, there is a need for new techniques that efficiently and reliably detect and reclaim storage capacity for search trees under MVCC.

According to one aspect of the invention, a method comprises: identifying one or more search trees to be traced, the search trees referencing one or more tree elements; identifying one or more candidate storage chunks, each of the candidate storage chunks corresponding to storage allocated on an associated storage device, each of the candidate storage chunks storing one or more of the tree elements, and each of the candidate storage chunks being marked as sealed; traversing the search trees to find currently referenced tree elements; identifying ones of the candidate storage chunks having no referenced tree elements as garbage storage chunks; and for one or more of the garbage storage chunks, reclaiming the corresponding storage allocated on the associated storage device.

In some embodiments, the method further includes: saving a checkpoint; pausing traversing the search trees; determining a first one of the tree elements to resume from based upon the checkpoint; and resuming traversing the search trees from the first one of the tree elements. Traversing the search trees may be paused in response to a search tree update, such as a journal update. In certain embodiments, saving the checkpoint comprises saving information (e.g., a search key) about the last tree element traversed. In some embodiments, determining a first one of tree elements to resume from comprises determining a first one of the tree elements to resume from based upon the search key associated with the last tree element traversed. Determining a first one of the tree elements to resume from may include locating a tree element to the left of the last tree element traversed.

In certain embodiments, saving the checkpoint comprises saving the checkpoint to a storage device shared between first and second nodes of a storage cluster, wherein pausing traversing the search trees is performed by the first storage node and resuming traversing the search trees is performed by the second storage node. Pausing traversing the search trees may include determining tree ownership changed.

According to another aspect of the invention, a distributed storage system includes: a plurality of storage devices; two or more storage nodes each having a search tree module configured to: identify one or more search trees to be traced, the search trees referencing one or more tree elements; identify one or more candidate storage chunks, each of the candidate storage chunks corresponding to storage allocated on an associated one of the storage devices, each of the candidate storage chunks storing one or more of the tree elements, and each of the candidate storage chunks being marked as sealed; traverse the search trees to find currently referenced tree elements; identify ones of the candidate storage chunks having no referenced tree elements as garbage storage chunks; and for one or more of the garbage storage chunks, reclaim the corresponding storage allocated on the associated storage device.

In some embodiments, the search tree modules are further configured to: save a checkpoint; pause traversing the search trees; determine a first one of the tree elements to resume from based upon the checkpoint; and resume traversing the search trees from the first one of the tree elements. The search tree modules may be configured to pause traversing the search trees in response to a search tree update, such as a journal update. The checkpoint includes information (e.g., a search key) about the last tree element traversed. In certain embodiments, the search tree modules are configured to determine a first one of the tree elements to resume from based upon the search key associated with the last tree element traversed. The search tree modules may be configured to determine a first one of the tree elements to resume from by locating a tree element to the left of the last tree element traversed.

In certain embodiments, the checkpoint is shared between the storage nodes, and wherein traversing the search trees can be paused on a first one of the storage nodes and resumed on a second one of the storage nodes. The search tree modules may be configured to pause traversing the search trees in response to a change in search tree ownership.

BRIEF DESCRIPTION OF THE DRAWINGS

The concepts, structures, and techniques sought to be protected herein may be more fully understood from the following detailed description of the drawings, in which:

FIG. 4 is a state diagram showing different states a storage chunk may be in;

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the structures and techniques sought to be protected herein, some terms are explained. As used herein, the phrases "computer," "computing system," "computing environment," "processing platform," "data memory and storage system," and "data memory and storage system environment" are intended to be broadly construed so as to encompass, for example, private or public cloud computing or storage systems, or parts thereof, as well as other types of systems comprising distributed virtual infrastructure and those not comprising virtual infrastructure. The terms "application," "program," "application program," and "computer application program" herein refer to any type of software application, including desktop applications, server applications, database applications, and mobile applications.

As used herein, the term "storage device" refers to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage device" can also refer to a storage array comprising one or more storage devices.

Figure 1:
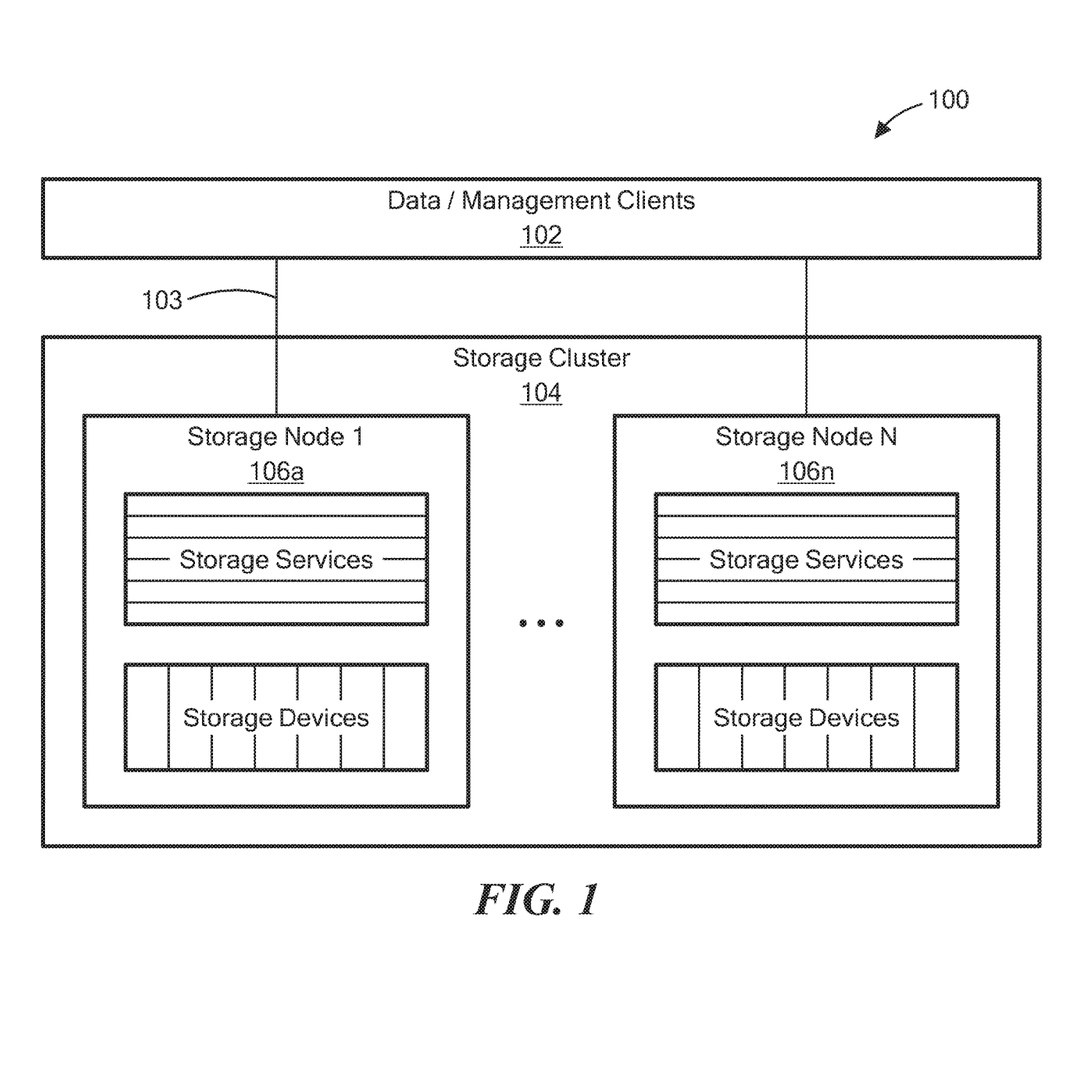
FIG. 1 is a block diagram of an illustrative distributed storage system.
Figure 1A:
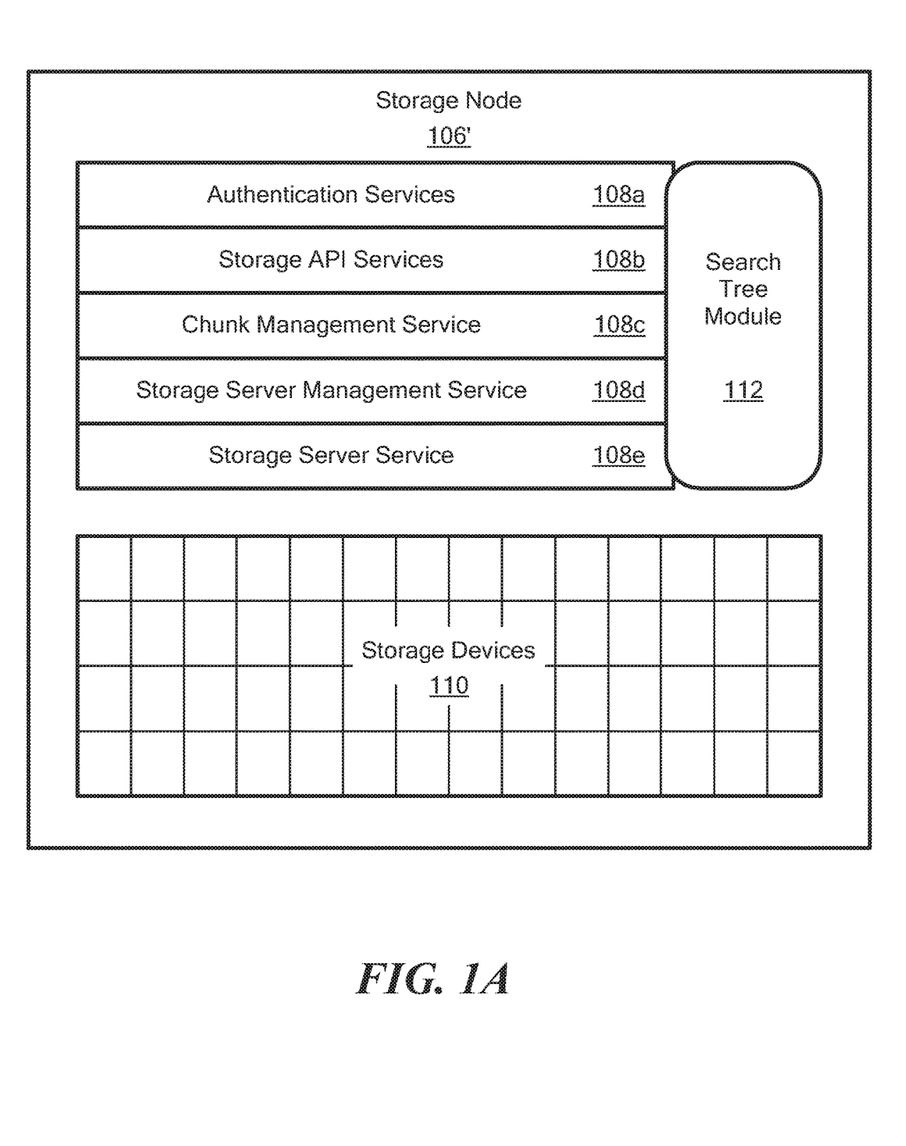
FIG. 1A is a block diagram of an illustrative storage node which may form a part of the distributed storage system of FIG. 1.

Referring to FIG. 1, an illustrative distributed storage system 100 includes one or more clients 102 in communication with a storage cluster 104 via a network 103. The network 103 may include any suitable type of communication network or combination thereof, including networks using protocols such as Ethernet, Internet Small Computer System Interface (iSCSI), Fibre Channel (FC), and/or wireless protocols. The clients 102 may include user applications, application servers, data management tools, and/or testing systems. The storage cluster 104 includes one or more storage nodes 106a ... 106n (generally denoted 106). An illustrative storage node is shown in FIG. 1A and described below in conjunction therewith.

In general operation, clients 102 issue requests to the storage cluster 104 to read and write data. Write requests may include requests to store new data and requests to update previously stored data. Data read and write requests include an ID value to uniquely identify the data within the storage cluster 104. A client request may be received by any available storage node 106. The receiving node 106 may process the request locally and/or may delegate request processing to one or more peer nodes 106.

For example, if a client issues a data read request, the receiving node may delegate/proxy the request to peer node where the data resides.

In various embodiments, the distributed storage system 100 comprises an object storage system, wherein data is read and written in the form of objects, which are uniquely identified by object IDs. In some embodiments, the storage cluster 104 utilizes Elastic Cloud Storage (ECS) from EMC Corporation of Hopkinton, Mass.

Referring to FIG. 1A, a storage node 106' may be the same as or similar to a storage node 106 in FIG. 1. The illustrative storage node 106' includes one or more services 108, one or more storage devices 110, and a search tree module 112. A storage node 106' may include a processor (not shown) configured to execute instructions provided by services 108 and/or module 112.

In the example shown, a storage node 106' includes the following services: an authentication service 108a to authenticate requests from clients 102; storage API services 108b to parse and interpret requests from clients 102; a storage chunk management service 108c to facilitate storage chunk allocation/reclamation for different storage system needs and monitor storage chunk health and usage; a storage server management service 108d to manage available storage devices capacity and to track storage devices states; and a storage server service 108e to interface with the storage devices 110.

A storage device 110 may comprise one or more physical and/or logical storage devices attached to the storage node 106a. A storage node 106 may utilize VNX, Symmetrix VMAX, and/or Full Automated Storage Tiering (FAST), which are available from EMC Corporation of Hopkinton, Mass. While vendor-specific terminology may be used to facilitate understanding, it is understood that the concepts, techniques, and structures sought to be protected herein are not limited to use with any specific commercial products.

The search tree module 112 includes hardware and/or software to provide search tree management and operations to the various services 108. In various embodiments, the search tree module 112 is provided as a library that is accessible by services 108. In some embodiments, the search tree module 112 implements a tracing garbage collection (GC) process described below in conjunction with FIG. 5.

Figure 2:
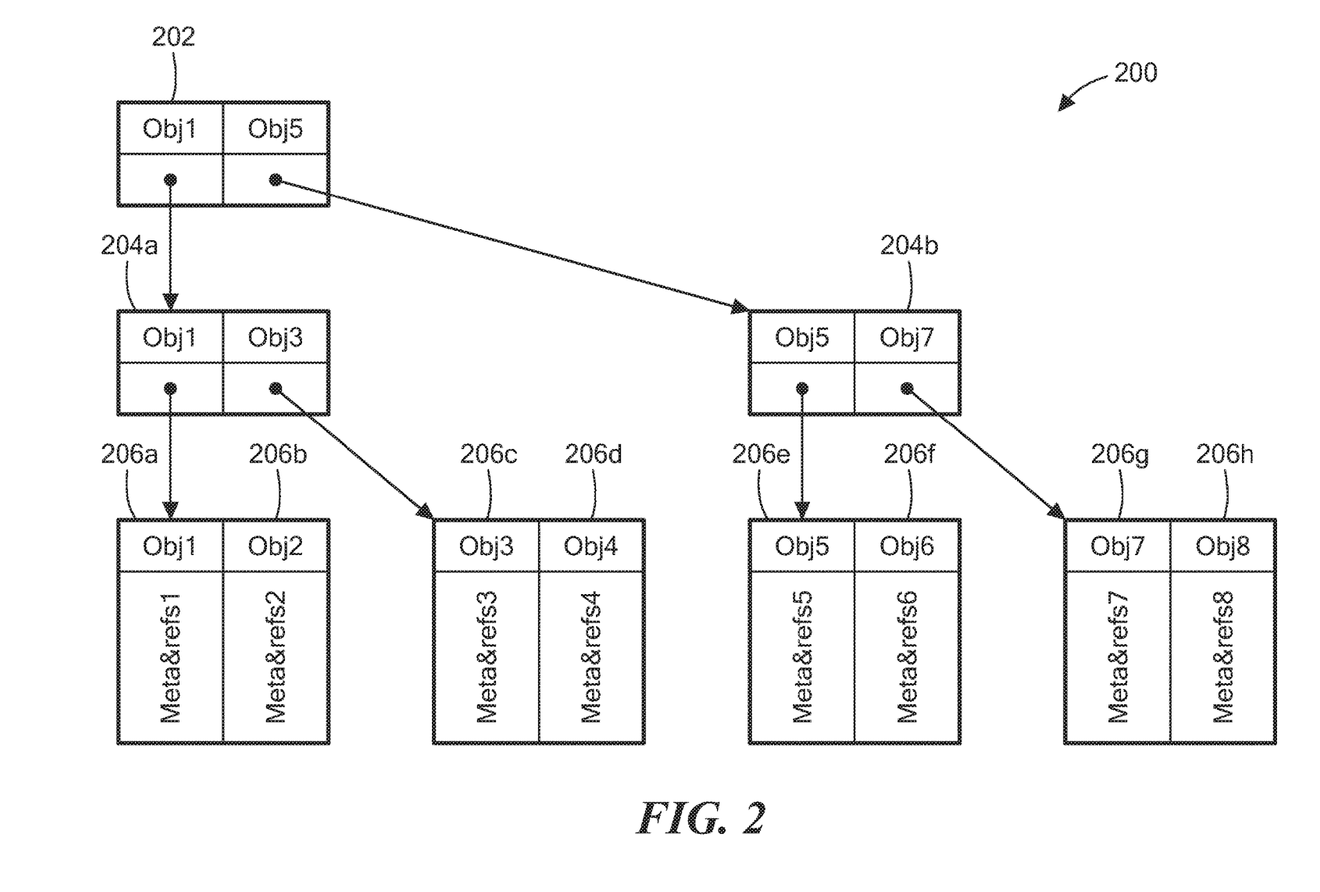
FIG. 2 is a diagram of an illustrative search tree.

Referring to FIG. 2, and also with reference to FIGS. 1 and 1A, various storage node services 108 work with so-called "tables" that contain key-value pairs. For example, an object storage system may utilize an Object Table wherein the keys correspond to object IDs and the values correspond to object metadata and object data references. As used herein, the term "object data reference" refers to information about the location of object data within one or more storage devices 110.

A table may be shared across multiple storage nodes 106 (and, in some cases, all storage nodes 106) of a storage cluster 104. Individual storage nodes 106 can maintain a local copy of the table. A given storage node 106 may add/delete/modify a table entries, and then propagate the changes to peer nodes 106. To guarantee data consistency, a table may be owned by one of the storage cluster nodes 106. Non-owner nodes 106 can read from the shared table, however only the owner node can modify it. Table ownership can migrate from one node to another, for example when nodes are added to, or removed from, the storage cluster. The above-described functionality may be provided by the search tree module 112.

To provide efficient access to an arbitrary number key-value pairs, a table may be implemented using a search tree (e.g., a B+ tree) stored to disk.

FIG. 2 shows an illustrative search tree 200 having a root node 202, internal nodes 204 (here, two internal nodes 204a and 204b), and leaves 206 (here, eight leaves 206a-206h). The nodes 202, 204 and leaves 206 are collectively referred to herein as "tree elements" and, in general, a search tree can include an arbitrary number of tree elements.

Each tree element stores one or more key-value pairs. The keys are referred to as "search keys." The type of information stored for a given value depends on the type of tree element. Within a root node 202 and internal nodes 204, values are references to other nodes 204 or to leaves 206. For example, as shown, internal node 204a includes two key-value pairs: search key "Obj1" references leaf 206a and search key "Obj3" references leaf 206c. Within leaves 206, values correspond to the actual data stored by the search tree. In the case of an Object Tree, the search keys may correspond to object IDs and the leaf values correspond to object metadata and object data references. For example, leaf 206a stores metadata for object ID "Obj1" in addition to the location of that object's data on disk.

It should be understood that search tree 200 is merely illustrative and that a typical search tree may include millions or even billions of tree elements.

Figure 3A:
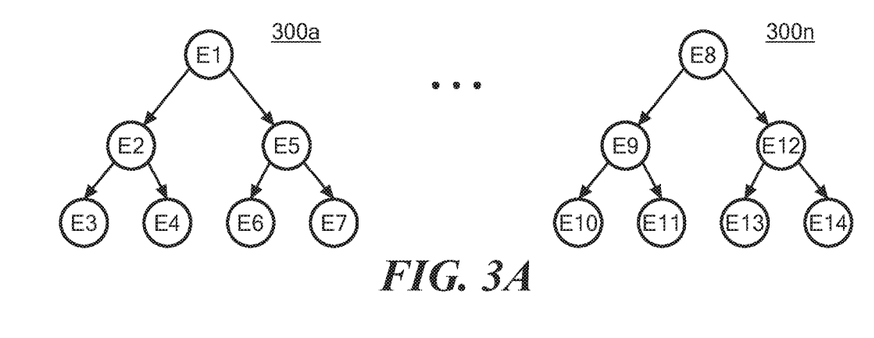
FIGS. 3A and 3B are diagrams showing how search trees may be stored on disk.
Figure 3B:
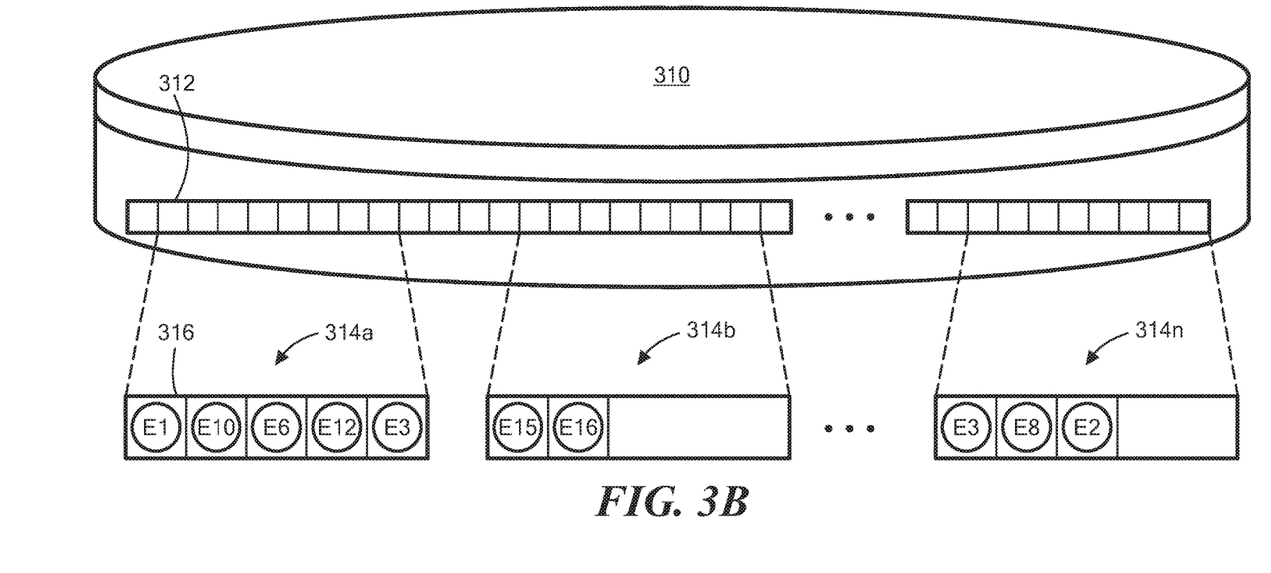

FIGS. 3A and 3B, together, illustrate how search trees may be stored within block storage devices, such as storage devices 110 of FIG. 1A.

Referring to FIG. 3A, an arbitrary number of search trees 300a . . . 300n (generally denoted 300) may be stored, with each search tree 300 having an arbitrary number of elements. In this example, a first search tree 300a includes elements E1-E7 and a second search tree 300b includes elements E8-E14, as shown.

Referring to FIG. 3B, and also with reference to FIG. 3A, search trees 300 can be stored within a block storage device 310, such as a hard disk. The block storage device 310 provides read and write access to fixed-size blocks 312. The block storage device 310 can be partitioned into a plurality of storage chunks 314a . . . 314n (generally denoted 314), wherein each storage chunk 314 corresponds to a fixed number of contiguous blocks 312. In the example shown, each storage chunk 314 corresponds to eight (8) contiguous blocks 312. In practice, a storage chunk 314 may correspond to more than eight (8) blocks 312.

Each element of a search tree 300 is stored within a page 316. As used herein, a "page" refers to a continuous portion of a storage chunk 314. The size of a page may vary depending on the data stored by the respective tree element. In various embodiments, each page 316 contains exactly one tree element.

A given storage chunk 314 may include elements from different search trees. For example, illustrative storage chunk 314a is show having elements E1, E6, and E3 from the first search tree 300a and elements E10 and E12 from the second search tree 300n. A storage chunk 314 may also include unreferenced (also referred to as "orphan" or "dead") tree elements, i.e., tree elements that are no longer referenced by any search tree 300 of interest to the storage system. For example, as shown, storage chunk 314b includes unreferenced tree elements E15 and E16.

To provide multi-version concurrency control (MVCC), elements of a search tree 300 are treated as immutable. Accordingly, all pages 316 (which contain tree elements) are also treated as immutable. Storage chunks 314 can be modified only by appending pages 316. When a storage chunk 314 becomes full (e.g., when there insufficient space to add a page 316), it is marked as "sealed." A sealed storage chunk 314 is treated as immutable.

If a user changes data stored by a search tree 300, new pages 316 are allocated for the corresponding tree elements that are modified. In the case of a B+ search tree, new pages 315 are allocated for: (1) a new leaf for the new/modified user data; (2) a new root node; and (3) at least N−2 internal nodes, where N is the current depth of the search tree. The new root node and internal nodes are configured to provide a search path to the new leaf. Thus, a search tree update results in the creation of a new tree that may share elements with the previous tree. A search tree update also results in unreferenced tree elements and wasted storage capacity allocated for the corresponding pages 316. It is desirable to reclaim this unused page storage. Because sealed storage chunks 314 are treated as immutable, reclamation of unused storage can only occur at the storage chunk level, not at the page level.

It will be appreciated that search tree updates can be expensive in terms of I/O overhead. To reduce this overhead, tree updates may be performed in bulk (i.e., "batched). In some embodiments, each search tree 300 has an associated journal of data updates. A journal may be limited in size. When a journal becomes full, a journal processor performs bulk tree updates in order to minimize the total cost of the update. The journal processor may be executed on a storage node 106 that owns the search tree. Journal updates should be as fast as possible to reduce impact on users.

Figure 4:
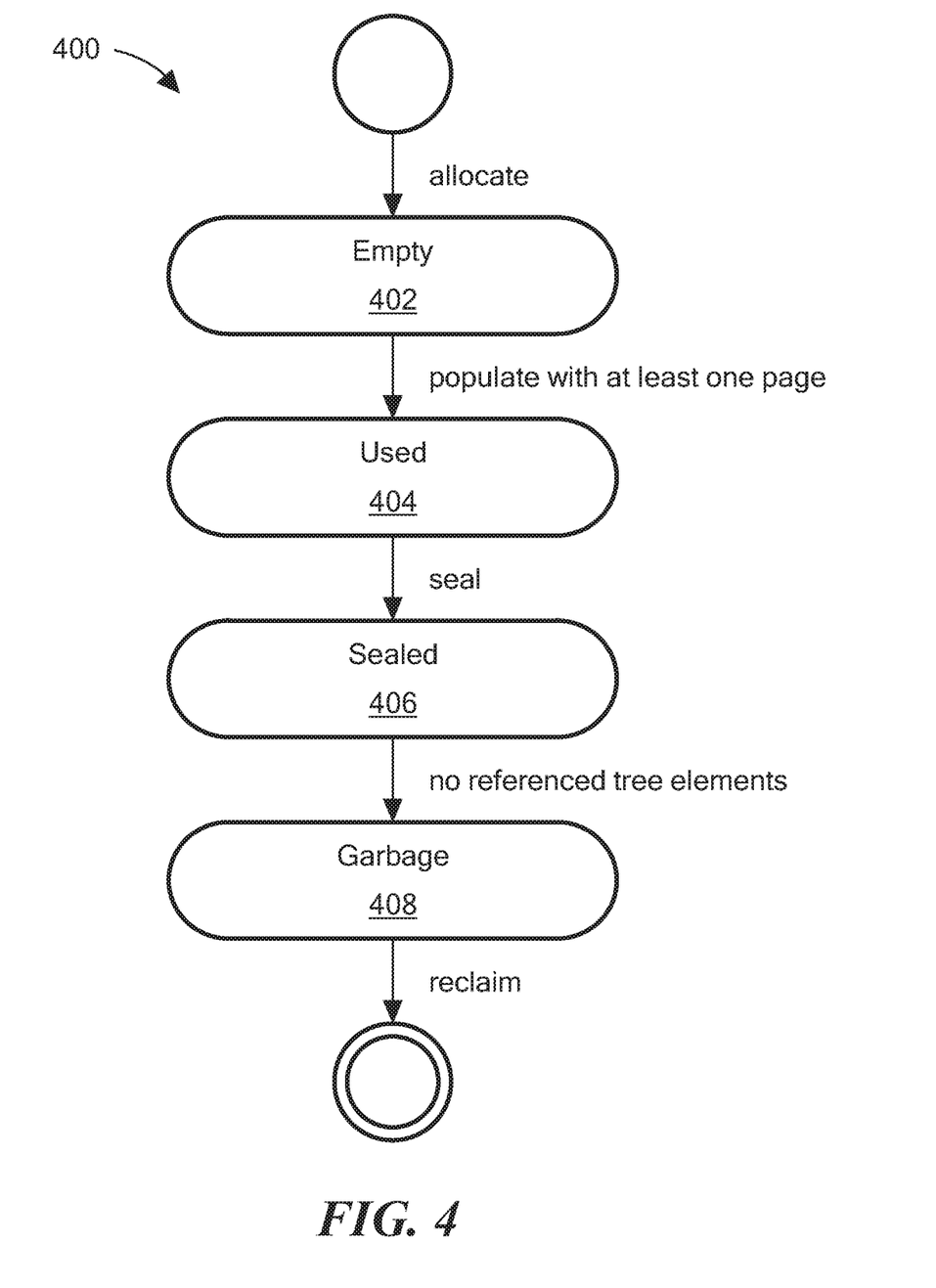

Referring to FIG. 4, and also with reference with FIGS. 3A and 3B, a state machine 400 shows the lifecycle of a storage chunk 314 used to store search tree elements. Newly allocated storage chunks are empty 402. The storage chunk 314 becomes used 404 when it is populated with at least one page 316 (i.e., tree element).

When the storage chunk becomes full, it is marked as sealed 406. As a result of tree updates, one or more of the tree elements stored by the chunk may become unreferenced. If a sealed storage chunk has no referenced tree elements, it becomes garbage 408 and its storage capacity can be reclaimed.

Figure 5:
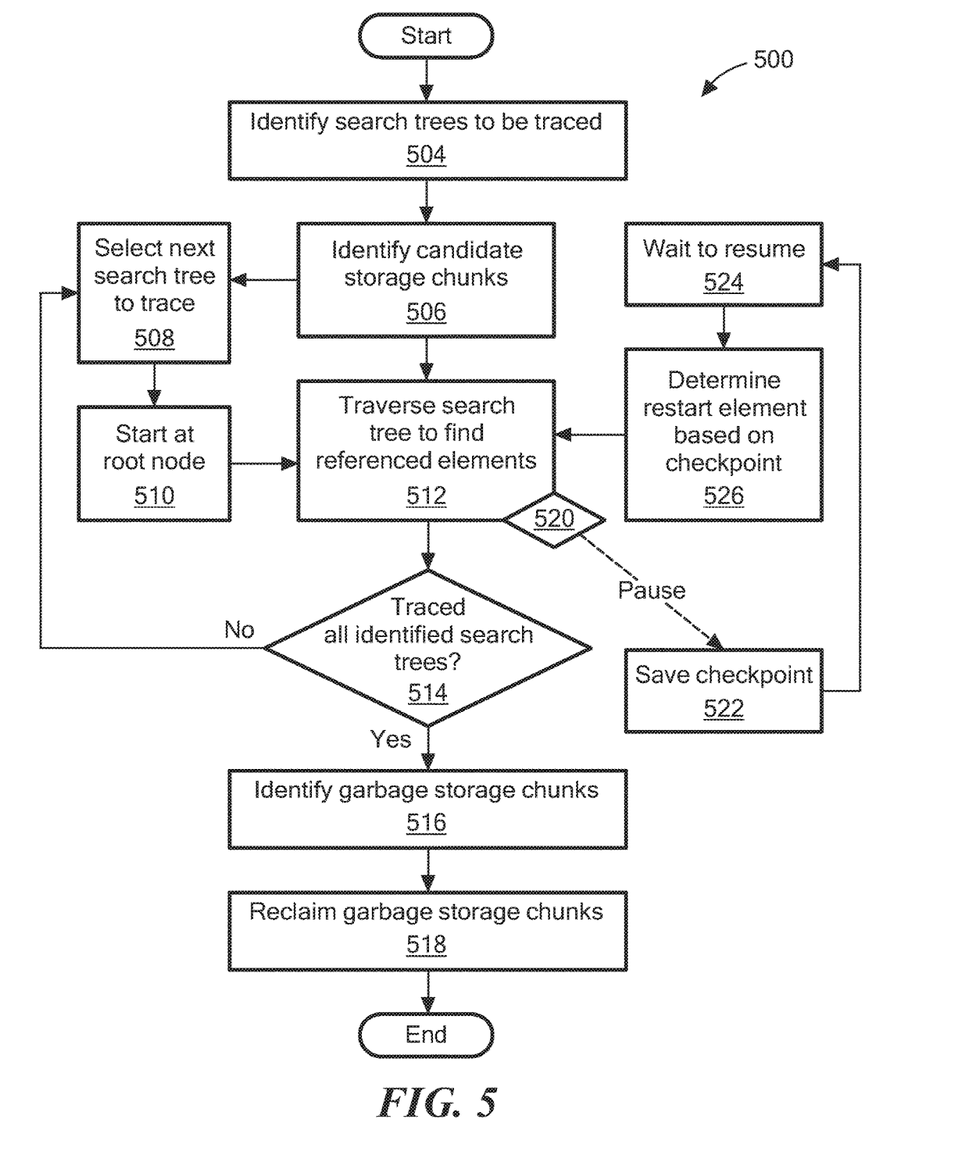
FIG. 5 is a flow diagram showing an illustrative process that may be used within the distributed storage system of FIG. 1.

FIG. 5 is a flow diagram showing illustrative processing that can be implemented within a storage cluster 104 (FIG. 1) and, more particularly, within a search tree module 112 (FIG. 1A) of one or more storage nodes 106.

Rectangular elements (typified by element 504), herein denoted "processing blocks," represent computer software instructions or groups of instructions. Diamond shaped elements (typified by element 514), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 5, and also referring to FIGS. 3A and 3B, an illustrative process 500 can perform GC within a distributed storage system, such as system 100 of FIG. 1. In some embodiments, portions of the process 500 are implemented in a distributed fashion across multiple storage nodes.

The illustrative process 500 uses depth-first traversal of search trees under MVCC to identify tree elements that are referenced (i.e., "live"). This technique is sometimes referred to as "tracing." After tracing one or more search trees in this manner, the process 500 identifies garbage storage chunks 314 to be reclaimed.

The GC process 500 can pause for various reasons. For example, the process may pause during tree updates to allow journal processing to complete as fast as possible. As another example, the process 500 may pause if a search tree being traced changes ownership. After the tree update, ownership change, or other triggering event completes, the process 500 may resume tracing at the point it left off (or as close as possible) using a so-called "checkpoint." This assures that the GC process 500 makes progress and eventually completes, guaranteeing that unused storage capacity is reclaimed.

Beginning at block 504, the process identifies one or more search trees to be traced. In some embodiments, all search trees used by the distributed storage system are traced.

At block 506, one or more storage chunks that are candidates for GC are identified (referred to herein as "candidate storage chunks"). To be a candidate for GC, a storage chunk must be sealed at the start of the GC run (i.e., before tracing begins). This ensures that if new elements are added to a search tree during the GC run, the corresponding storage chunk capacity will not be inadvertently reclaimed. Other criteria may also be required for candidate storage chunks.

At block 508, one of the identified search tree is selected for tracing and, at blocks 510 and 512, the selected search tree is traced. In various embodiments this includes performing depth-first traversal, starting with the root node, to find all tree elements that are currently referenced (i.e., "live"). For example, the processing of block 512 may include traversing tree 300a of FIG. 3A by visiting its elements in the following order: E1, E2, E3, E4, E5, E6, and E7.

The processing of blocks 508-512 may be repeated until all identified search trees have been traced (block 514).

At block 516, garbage storage chunks are identified. This may include identifying, from among the candidate storage chunks, storage chunks that have no referenced tree elements as determined by the preceding tracing. For example, referring to FIG. 3B, storage chunk 314a would not be garbage because it includes live tree elements (e.g., element E1 is referenced by search tree 300a), whereas storage chunk 314b does not.

At block 518, the storage capacity allocated to the garbage storage chunks can be reclaimed. This may include issuing commands to the storage devices 110 (FIG. 1A) to de-allocate (or "free") the associated storage capacity.

As discussed above, it may be desirable to pause the GC process 500 for various reasons. Thus, for example, when a search tree is being traced (block 512), the process 500 may decide to pause (block 520). For example, the process 500 may detect (or otherwise be notified) that journal processing has commenced and, thus, decide to pause. As another example, the process 500 may detect that the search tree currently being traced has changed ownership, in which case the process 500 may be resumed on the new-owner storage node 104. It should be appreciated that a decision 520 to pause a GC run can also be made within other processing blocks, not just within block 512.

When the process 500 is paused, a checkpoint may be saved (block 522) so that the process may resume where it left off, or at another suitable point. A checkpoint may include any suitable information to allow the process 500 to resume while guaranteeing that GC progress is made. In some embodiments, the checkpoint includes the search key for the last tree element being processed at the time of pausing. For example, when traversing an Object Table, the checkpoint may include an object ID for the last tree element processed. In some embodiments, checkpoints are shared across storage nodes 106 (FIG. 1). This allows the process 500 to be paused on a first storage node and resumed on a second storage node.

At block 524, the process waits to resume. If the process 500 paused due to a tree update, it can resume when the tree update completes. If the process 500 paused due to a change in tree ownership, it may resume when the change in tree ownership completes.

It is appreciated that it may not be possible to resume tracing at the specific tree element indicated by the checkpoint, for example if that element was removed as a result of the tree update. Thus, before resuming, the process 500 can determine a tree element at which to restart tracing (block 526). As described below in conjunction with FIGS. 6A and 6B, the process 500 can utilize the fact that search trees are under MVCC to ensure that GC progresses, even if the process is repeatedly paused/resumed, and that every referenced storage chunk is identified.

Figure 6A:
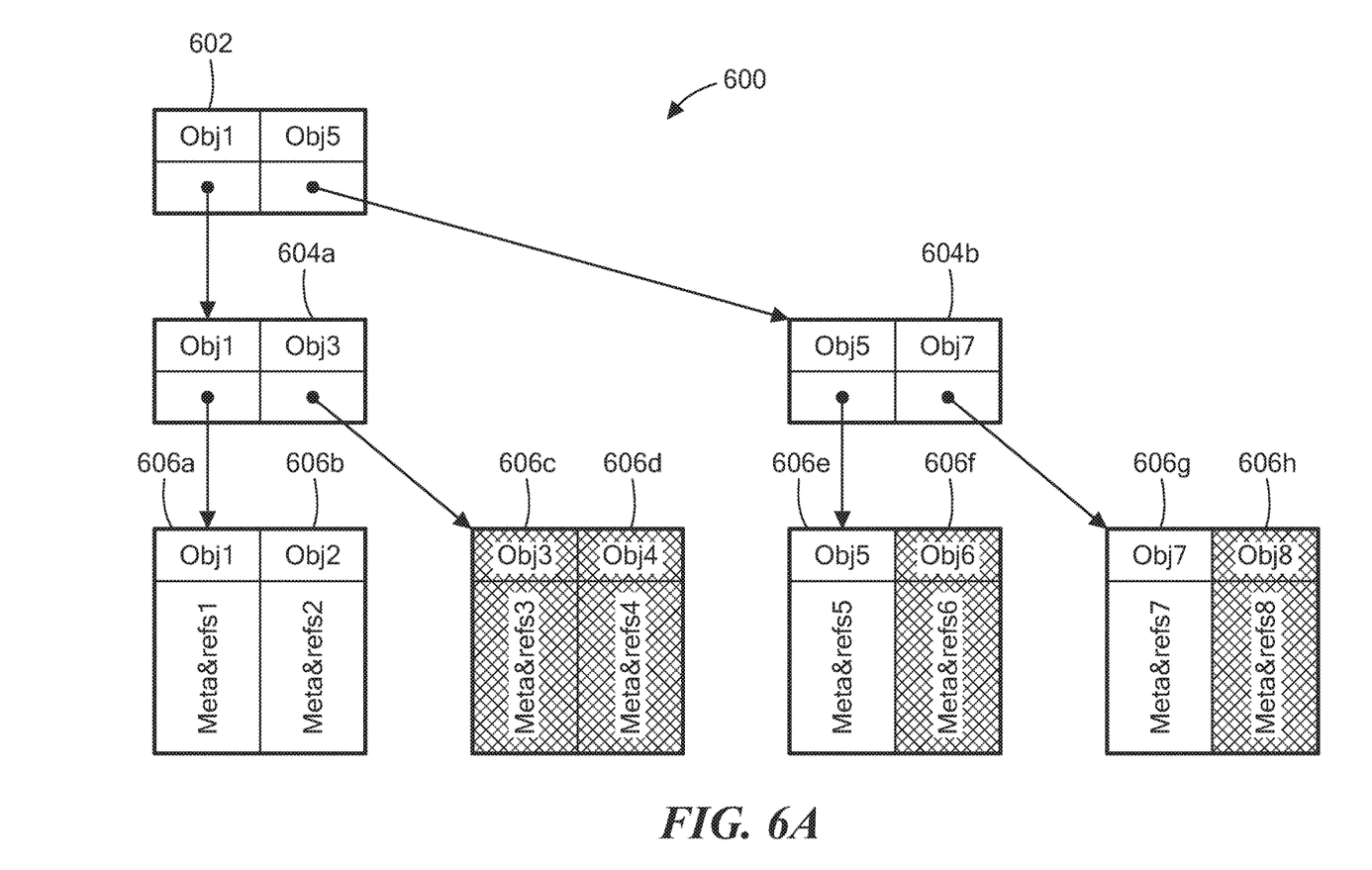
FIGS. 6A and 6B are diagrams of illustrative search trees.
Figure 6B:
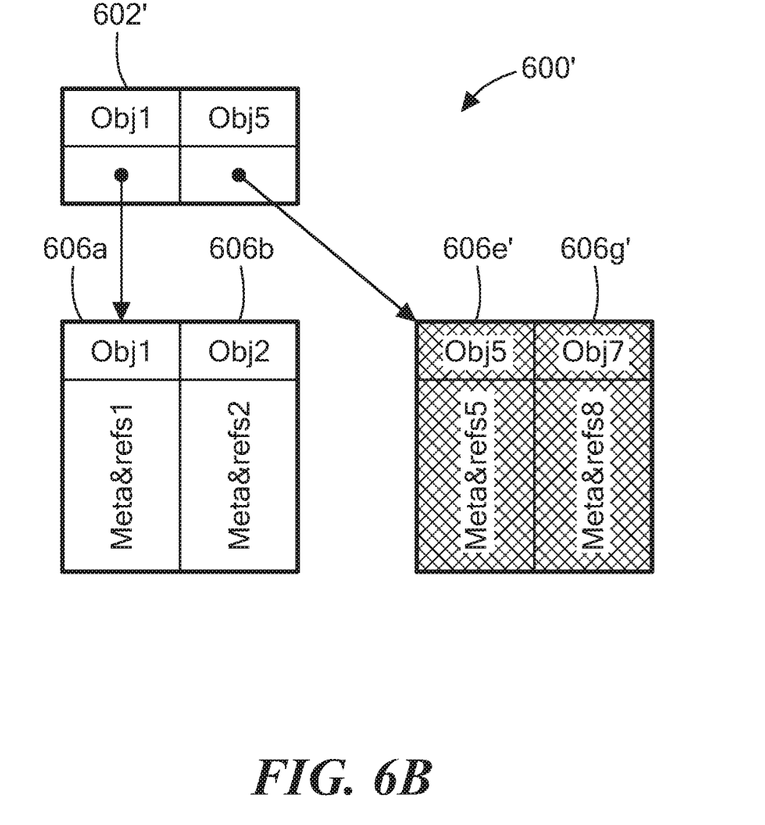

FIG. 6A shows a search tree 600 having a root node 602, internal nodes 604a, 604b, and leaves 606a-606h. FIG. 6B shows another search tree 600' may result from an update to search tree 600 of FIG. 6A. In particular, search tree 600' may resume from deleting leaves 606c, 606d, 606f, and 606h from search tree 600, as indicated with crosshatching in the figure. The resulting tree 600' includes a new root node 602' which directly references leaves 606a and 606e'. The tree elements 606e' and 606g' store the same data as elements 600e and 600g, respectively, but may correspond to different storage chunk locations.

When the tree update commences, the GC process 500 (FIG. 5) may pause while traversing the search tree 600 and store a checkpoint corresponding to the tree element being processed at the time of pausing. When the process resume, it resumes tracing of the updated search tree 600' at some element determined using the checkpoint.

If possible, the process 500 may resume from that exact tree element on which it paused. For example, if the process 500 pauses on element 606b when traversing search tree 600, it can resume tracing from this same element (i.e., the same storage location) in search tree 600'.

When tracing cannot resume from the exact tree element it paused on, a tree element that contains the last processed search key may be used as the point to resume from. For example, assume the process 500 pauses on element 606e (search key "Obj5") when traversing search tree 600. The process cannot resume from this exact tree element in search tree 600' because its storage location changed. Instead, the process can search for an element in the updated tree 600' having the same search key "Obj5." Thus, in the example shown, the process may resume tracing at tree element 606e'.

If the updated search tree 600' does not include the last processed search key, the process 500 may resume tracing from the first element to the left of this search key with the updated search tree 600'. For example, assume the process 500 pauses on element 606f (search key "Obj6") when traversing search tree 600. The process 500 cannot resume from this exact location within search tree 600', nor can it resume from different location corresponding to search key "Obj6." Instead, the process 500 may determine the tree element to the left of the checkpoint: leaf 606e' in this example. Any suitable technique can be used to locate the first tree element to the left of the checkpoint. For example, search trees typically order tree elements by search key and, thus, the first tree element to the left can be determined by comparing search keys. Because the process 500 traverses search trees in a depth-first manner (with implicit left-to-right ordering), resuming from the first tree element to the left of the checkpoint ensures that all referenced tree elements will be traversed.

It will be appreciated that the processing techniques described above in conjunction with FIGS. 5, 6A, and 6B provide effective and reliable tracing GC for search trees under MVCC. All "live" tree elements will be traversed and, thus, the corresponding storage chunks will not inadvertently reclaimed. Further, tree elements that are added during the GC process 500 (e.g., when the process 500 is paused) are not subject to GC. The processing techniques work efficiently for large trees that are stored on hard drives and that are updated using journaling. Moreover, the processing techniques can be used within various enterprise-level storage systems and databases that use search trees under MVCC.

Figure 7:
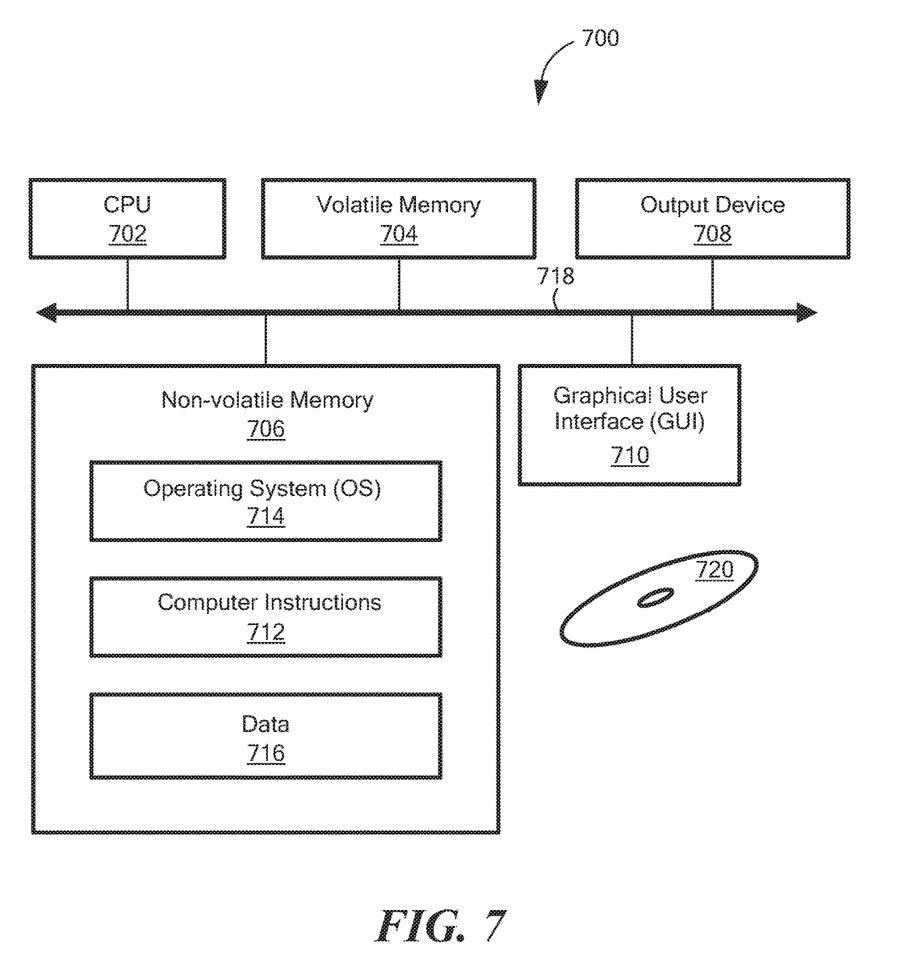
FIG. 7 is a schematic representation of an illustrative computer for use with the systems of FIGS. 1 and 2.

FIG. 7 shows an illustrative computer or other processing device 700 that can perform at least part of the processing described herein. The computer 700 includes a processor 702, a volatile memory 704, a non-volatile memory 706 (e.g., hard disk), an output device 708 and a graphical user interface (GUI) 710 (e.g., a mouse, a keyboard, a display, for example), each of which is coupled together by a bus 718. The non-volatile memory 706 stores computer instructions 712, an operating system 714, and data 716. In one example, the computer instructions 712 are executed by the processor 702 out of volatile memory 704. In one embodiment, an article 720 comprises non-transitory computer-readable instructions.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

What is claimed is:

1. A method for garbage collection in a storage system having a plurality of storage devices, the method comprising:

identifying a plurality of storage chunks that are marked as full, the storage chunks storing a plurality of tree elements, the storage chunks being formed on one or more of the storage devices;

classifying each of the plurality of tree elements as either a live tree element or an unreferenced tree element by traversing a plurality of search trees to identify ones of the plurality of tree elements that are currently active, wherein only tree elements in storage chunks that are marked as full are classified as either a live tree element or an unreferenced tree element; and identifying one or more of the plurality of storage chunks that include only unreferenced tree elements and no live tree elements, and reclaiming the identified one or more storage chunks.

2. The method of claim 1 further comprising:
saving a checkpoint;
pausing the traversing of the plurality of search trees;
determining a first one of the tree elements to resume from based upon the checkpoint; and
resuming traversing the search trees from the first one of the tree elements.

3. The method of claim 2 wherein pausing traversing the search trees comprises pausing traversing the search trees in response to a search tree update.

4. The method of claim 3 wherein the traversing of the plurality of search trees is paused in response to a search tree journal update.

5. The method of claim 2 wherein saving the checkpoint comprises saving information about a last tree element traversed.

6. The method of claim 5 wherein saving information about the last tree element traversed comprises saving a search key associated with the last tree element traversed.

7. The method of claim 6 further comprising selecting one of the tree elements to resume from based upon the search key associated with the last tree element traversed.

8. The method of claim 2 wherein the traversing of the plurality of search trees is paused on a first node of the storage system and the traversing of the plurality of search trees is resumed on a second node of the storage system.

9. The method of claim 8 wherein the pausing traversing the search trees comprises determining tree ownership changed.

10. A distributed storage system, comprising:
a plurality of storage devices; and
one or more processors operatively coupled to the plurality of storage devices, the one or more processors being configured to:
identify a plurality of storage chunks that are marked as full, the storage chunks storing a plurality of tree elements, the storage chunks being formed on one or more of the storage devices;
classify each of the plurality of tree elements as either a live tree element or an unreferenced tree element by traversing a plurality of search trees to identify ones of the plurality of tree elements that are currently active, wherein only tree elements in the storage chunks that are marked as full are classified as either a live tree element or an unreferenced tree element; and
identify one or more of the plurality of storage chunks that include only unreferenced tree elements and no live tree elements, and reclaim the identified one or more storage chunks.

11. The distributed storage system of claim 10 wherein the one or more processors are further configured to:
save a checkpoint;
pause traversing the search trees;
determine a first one of the tree elements to resume from based upon the checkpoint; and
resume traversing the search trees from the first one of the tree elements.

12. The distributed storage system of claim 11 wherein the one or more processors are further configured to pause traversing the search trees in response to a search tree update.

13. The distributed storage system of claim 12 wherein the traversing of the plurality of search trees is paused in response to a search tree journal update.

14. The distributed storage system of claim 11 wherein the checkpoint includes information about a last tree element traversed.

15. The distributed storage system of claim 14 wherein the checkpoint includes a search key associated with the last tree element traversed.

16. The distributed storage system of claim 15 wherein the one or more processors are further configured to select one of the tree elements to resume from based upon the search key associated with the last tree element traversed.

17. The distributed storage system of claim 11 wherein traversing the search trees is paused on a first node of the distributed storage system and resumed on a second node of the distributed storage system.

18. The distributed storage system of claim 17 wherein the one or more processors are further configured to pause traversing the search trees in response to a change in search tree ownership.

* * * * *